United States Patent [19]

McMahan et al.

[11] Patent Number: 4,639,840
[45] Date of Patent: Jan. 27, 1987

[54] VEHICLE HEADLAMP ASSEMBLY

[75] Inventors: David R. McMahan; Richard W. Nicholas, both of Anderson, Ind.

[73] Assignee: General Motors Corporation, Detroit, Mich.

[21] Appl. No.: 743,088

[22] Filed: Jun. 10, 1985

Related U.S. Application Data

[63] Continuation-in-part of Ser. No. 677,697, Dec. 3, 1984, abandoned.

[51] Int. Cl.$^4$ ............................................. B60Q 1/04
[52] U.S. Cl. ..................................... 362/80; 362/289; 362/419
[58] Field of Search ................... 362/61, 80, 249, 250, 362/307, 308, 329, 418, 419, 269, 273, 275, 285, 287–289

[56] References Cited

U.S. PATENT DOCUMENTS

| | | |
|---|---|---|
| 2,826,682 | 3/1958 | Falge . |
| 2,911,524 | 11/1959 | Falge et al. . |
| 3,612,854 | 10/1971 | Todd ................................. 362/269 |
| 3,643,087 | 2/1972 | Little . |
| 3,710,097 | 1/1973 | Bright et al. . |
| 4,412,275 | 10/1983 | McMahan ......................... 362/269 |
| 4,414,614 | 11/1983 | McMahan et al. ................. 362/269 |

Primary Examiner—Craig R. Feinberg
Assistant Examiner—David A. Okonsky
Attorney, Agent, or Firm—Edward J. Biskup

[57] ABSTRACT

A headlamp assembly provided with a retainer for maintaining a headlamp unit in an adjustable support bracket and having a rim that provides an aiming surface for the aiming pads of the headlamp unit. The support bracket carries spring means which engages a rear portion of the headlamp unit and biases the aiming pads of the headlamp unit into engagement with the rim with the result that when a replacement lamp unit is mounted in the support bracket, the replacement lamp unit is automatically aimed by the retainer.

3 Claims, 7 Drawing Figures

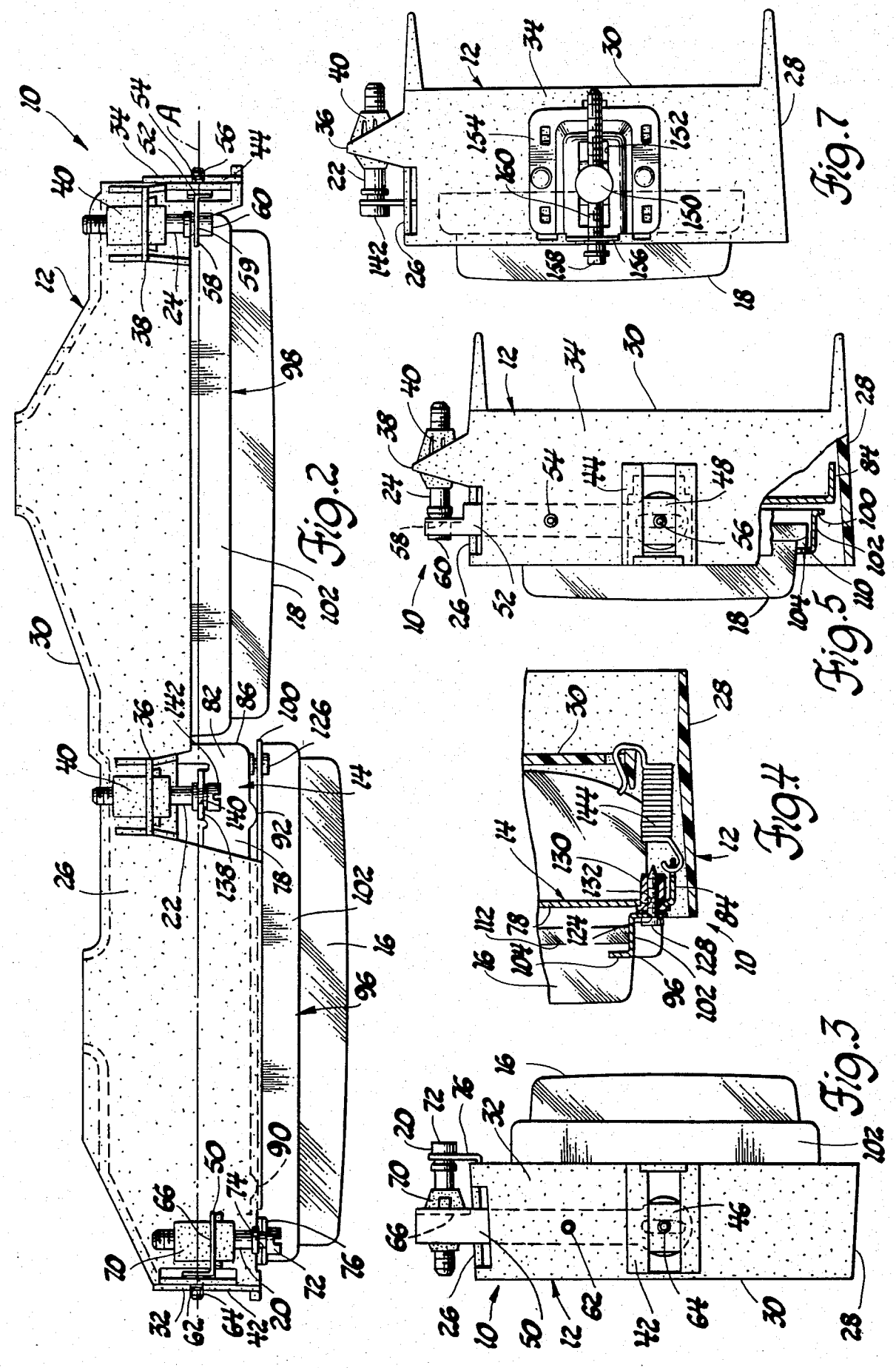

VEHICLE HEADLAMP ASSEMBLY

This is a continuation-in-part application of U.S. Ser. No. 677,697 filed on Dec. 3, 1984, now abandoned.

This invention concerns a headlamp assembly attachable to the front end of an automobile body and more particularly pertains to a headlamp assembly that allows a preaimed but burned-out headlamp unit to be replaced within a support bracket by another headlamp unit without requiring the latter to be reaimed.

More specifically, the headlamp assembly according to the present invention is intended for use with a rectangular headlamp unit having a peripheral flange the outer surface of which is provided with three aiming pads that define the aiming plane of the lamp unit. The headlamp assembly is adapted to be mounted to the vehicle body at the front end thereof and includes an adjustable support bracket for aiming the headlamp unit about a horizontal axis and about a vertical axis. In the preferred form, the support bracket has an opening formed therein that receives the headlamp unit. The opening is surrounded by a rectangularly shaped front face having three projections connected thereto for defining a vertically orientated seating plane. A retainer is provided for maintaining the headlamp unit in the support bracket and includes a rectangular ring portion having the outer end formed with a radially inwardly extending rim portion. The inner end of the ring portion is formed with a radially extending flange located in a plane parallel to the plane of the rim portion. The retainer is shaped and sized so when it is fastened to the support bracket for retaining the headlamp unit, the flange of the retainer is seated on the three projections of the support bracket and the flange of the headlamp unit is located within the confines of the ring portion of the retainer. In addition, spring means are provided between the support bracket and the headlamp unit for biasing the latter towards the retainer so the aiming pads of the headlamp unit are seated on the rim of the retainer to automatically aim the headlamp unit The objects of the present invention are to provide a new and improved headlamp assembly provided with a retainer for maintaining the headlamp unit in a support bracket and having a rim that establishes an aiming surface for the headlamp unit so when the aiming pads of a replacement headlamp unit are maintained against the rim through a spring assembly, the headlamp unit is automatically aimed; to provide a new and improved headlamp assembly that permits a preaimed but burned-out headlamp unit to be replaced within a support bracket by a new headlamp unit without requiring reaiming of the new headlamp unit; to provide a new and improved headlamp assembly for the front end of a motor vehicle in which the seating plane for the retainer ring which holds the headlamp unit in place is parallel to the aiming plane of the headlamp unit; and to provide a new and improved headlamp assembly that includes a support bracket having three projections thereon that define a seating plane for a retainer provided with a pair of axially spaced planar surfaces one of which seats against the three projections and the other of which serves as an aiming plane against which the aiming pads of the headlamp unit are adapted to be seated.

The above and other objects of the present invention will be apparent from the following detailed description when taken in conjunction with the accompanying drawings in which:

FIG. 2 is a plan view of the headlamp assembly taken on line 2—2 of FIG. 1;

FIG. 3 is a side elevational view of the headlamp assembly taken on line 3—3 of FIG. 1;

FIG. 4 is a fragmentary sectional view taken on line 4—4 of FIG. 1;

FIG. 5 is a side elevational view of the headlamp assembly taken on line 5—5 of FIG. 1;

FIG. 7 is a side elevational view similar to the view shown in FIG. 5 but shows a modified form of a block member incorporated with the associated side wall of the support housing.

Figure 1:
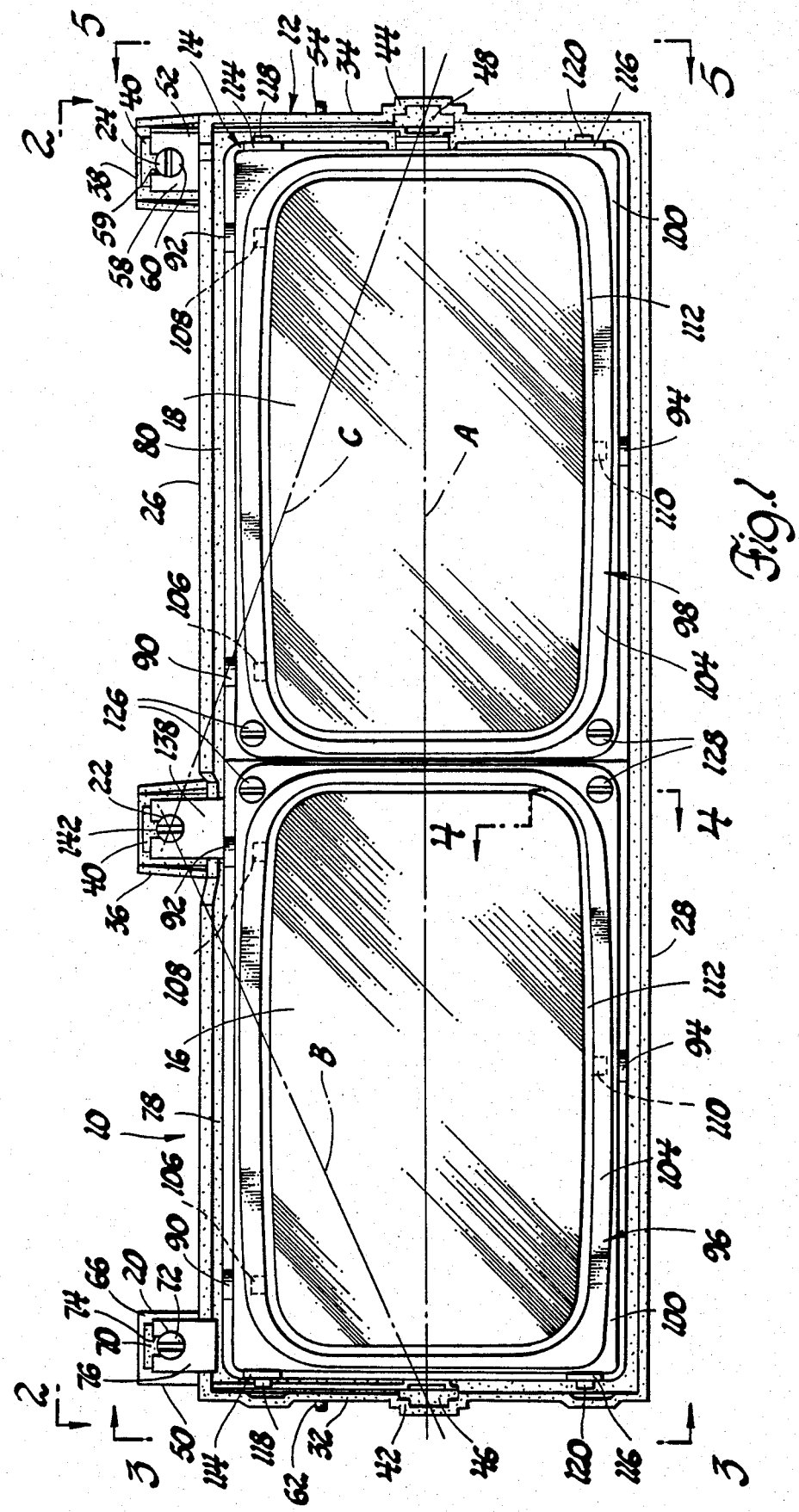
FIG. 1 is a front elevational view of a headlamp assembly made in accordance with the present invention.

Referring to the drawings and more particularly FIGS. 1 through 5 thereof, a headlamp assembly 10, according to the present invention, is shown comprising, in general, a support housing 12, a headlamp support bracket 14 and a pair of rectangular vehicle headlamp units 16 and 18 mounted within the support bracket 14. The headlamp assembly 10 includes three adjustment screws 20, 22, and 24 which serve to adjustably position the headlamp support bracket 14 and the supported headlamp units 16 and 18 about a horizontal axis A and a pair of inclined axes B and C, all of which are located in a single plane passing through the horizontal axis A as seen in FIG. 2. Thus, as will be more fully explained hereinafter, by appropriate rotation of the adjustment screws 20, 22, and 24, the headlamp units 16 and 18 can be properly aimed about a horizontal axis as well as a vertical axis passing through the point of intersection of the axes B and C.

Figure 6:
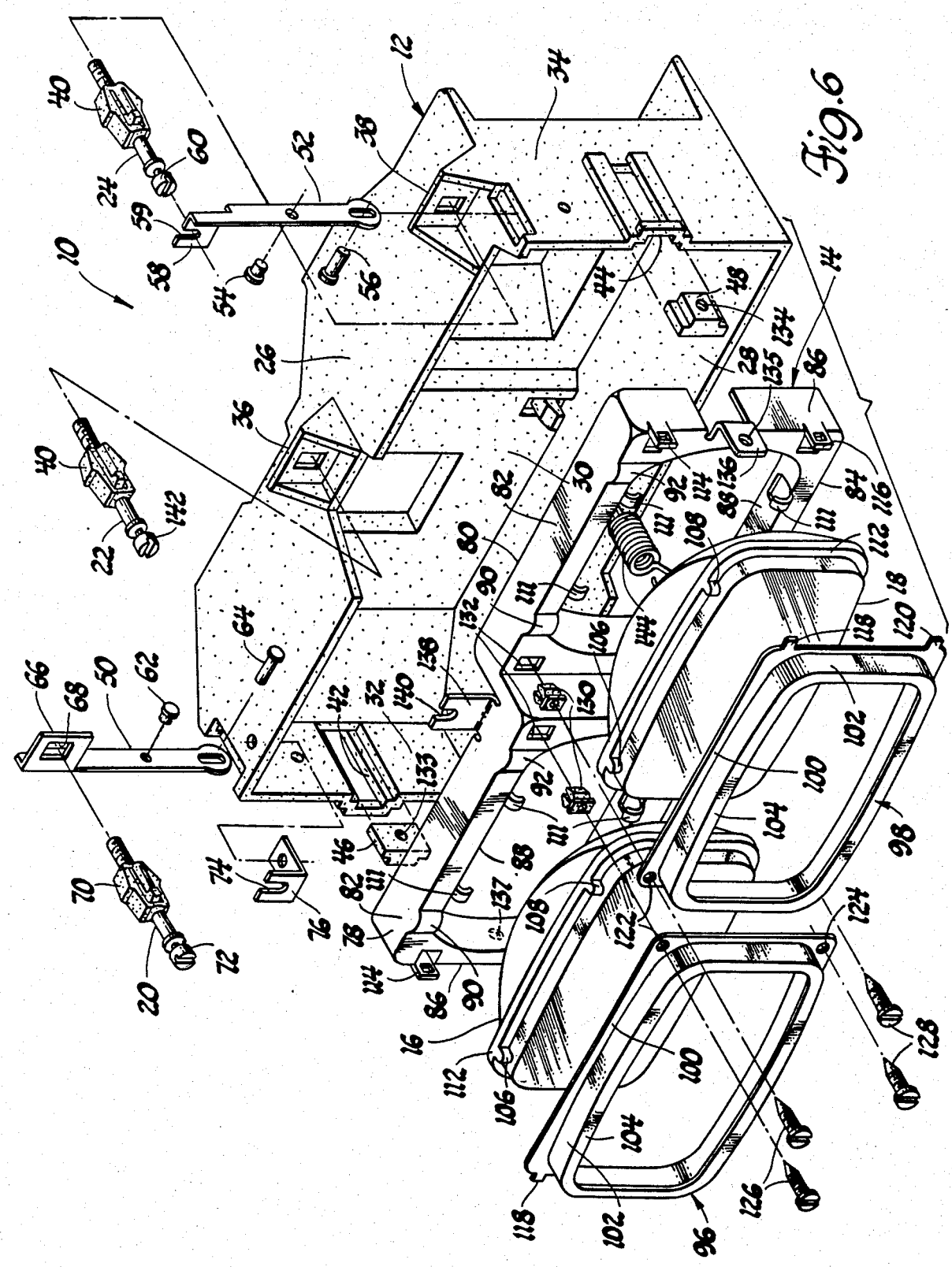
FIG. 6 is an exploded view of the headlamp assembly shown in FIGS. 1 through 5.

More specifically, as seen in FIG. 6 the support housing 12 is formed from a plastic material and includes a top wall 26, a bottom wall 28, a back wall 30, and a pair of laterally spaced and parallel side walls 32 and 34, all of which cooperate to define a rectangular cavity. The top wall 26 is integrally formed with a pair of upstanding ears 36 and 38, each of which has a rectangular opening therein for rigidly retaining a snap-in type self-retaining plastic nut 40. In addition, the side walls 32 and 34 are respectively formed with identical horizontally extending tracks 42 and 44 each of which takes the form of a hat-shaped groove when viewed in cross section. The tracks 42 and 44 accommodate a pair of identical block members 46 and 48, respectively, each of which is adapted to be retained within and slide horizontally in the associated track.

The side walls 32 and 34 also support a pair of pivotable levers 50 and 52, respectively. As best seen in FIGS. 2 and 5, the lever 52 has the intermediate portion thereof pivotally connected to the side wall 34 by a pin 54. The lower end of the lever 52 is pivotally connected to the block member 48 by a pin 56 while the upper end of the lever 52 is formed with a flange 58 provided with a vertically oriented slot 59. The slot 59 receives the head 60 of the adjustment screw 24 which, in turn, is threadably received by the nut 40 mounted in the ear 38. As is conventional, the head 60 of adjustment screw 24 is retained by the flange 58 in a manner that allows it to be rotatable within the slot 59 but not be axially movable relative to the flange 58.

As seen in FIGS. 2 and 3, the intermediate portion of the lever 50 is pivotally connected to the side wall 32 by a pin 62 while the lower end of the lever 50 is pivotally connected to the block member 46 by a pin 64. The top end of the lever 50 is formed with a flange 66 having a square opening 68 which receives and retains a plastic nut 70 identical to nuts 40 mounted in the ears 36 and 38. The adjustment screw 20 extends into and is threadably received by the nut 70. As is the case with head 60 of screw 24, the head 72 of the adjustment screw 20 is mounted for rotation but not relative axial movement in a vertically oriented slot 74 formed in an L-shaped bracket 76 rigidly fixed to the top wall 26 of the support housing 12 by a rivet, not shown.

The support bracket 14 is formed from a sheet metal stamping and comprises a pair of offset and integrally interconnected lamp support sections 78 and 80 that are generally rectangular in configuration as seen in FIG. 6. Each of the lamp support sections 78 and 80 has a top edge 82, a bottom edge 84, and a side edge 86. An opening 88 is formed in each of the lamp support sections 78 and 80 of the support bracket 14 through which the rear ends of the headlamp units 16 and 18 project for electrical connection with the usual socket of the wire harness of the vehicle. As seen in FIGS. 1 and 6, the front face of each lamp support section 78 and 80 is formed with three projections 90, 92 and 94 which define a plane adapted to cooperate with the associated retainer 96 or 98 for properly locating the headlamp units 16 and 18. In this regard, each retainer 96 and 98 includes a radially outwardly extending flange 100 which is integral with a generally rectangular ring portion 102 formed with a radially inwardly extending rim portion 104. The rear planar surface of the flange 100 is adapted to seat against the projections 90, 92 and 94, and defines a plane which is parallel to the plane of the rim 104. Both the plane of the flange 100 and the plane of the rim 104 are intended to coincide with the aiming plane of the associated lamp unit. The aiming plane of the headlamp units 16 and 18, in each case, is defined by the three aiming pads 106, 108 and 110 on the vertical outer or front surface of a radially extending peripheral flange 112 which is integral with and surrounds each of the lamp units 16 and 18 as seen in FIGS. 1 and 6. Thus, when it is necessary to replace a headlamp unit, the headlamp aiming plane as defined by the aiming pads 106, 108, 110 will be placed in the identical location as the aiming plane defined by the corresponding aiming pads of the former headlamp unit relative to the vehicle. Also the fact that the support bracket 14 will carry both the lower beam and the upper beam headlamp units, which in this instance are respectively represented by the units 16 and 18, both headlamp units can be adjusted together. This is possible as a direct result of making the aiming plane and the seating plane of a headlamp unit coincident.

Further relative to the headlamp aiming feature of the headlamp assembly 10, it will be noted that each outer side edge 86 of the support bracket 14 is provided with a pair of vertically spaced ears 114 and 116 which are adapted to receive a pair of tangs 118 and 120, respectively that are integral with the flange 100 of the associated retainer 96 or 98. As aforementioned, each retainer has a rim 104 located in a plane parallel to the planar rear surface of the flange 100. As also mentioned, to position the headlamp properly the aiming pads 106, 108 and 110 of the associated headlamp unit are required to be seated against the rim 104 and, in this regard, four spring members 111 (two at the upper part of the opening 88 and two directly below and at the lower part of opening 88) are provided on the face of each lamp section 78 and 80. The spring members 111 extend into the opening 88 for engaging the vertical rear or inner surface of the flange 112 of the associated headlamp unit and serve to bias the latter towards the associated retainer so as to press the aiming pads 106, 108, and 110 into engagement with the plane of the rim 104 of the associated retainer. Also, the flange 100 of the rim 104 has a pair of vertically spaced holes 122 and 124 through which the screws 126 and 128 extend respectively for threadable engagement with self-retaining plastic nuts 130 which are adapted to be fixed within accommodating rectangular openings 132 formed in the face of each lamp section 78 and 80 of the support bracket 14. Thus, when the two headlamp units 16 and 18 are located in the two openings 88, 88 of the lamp sections 78 and 80 of support bracket 14 and each retainer 96 and 98 has the tangs 118 and 120 thereof located in the ears 114 and 116, the screws 126 and 128 of each retainer are tightened so that the rear planar surface of flange 100 is seated on the associated three projections 90, 92 and 94 of the support bracket 14. At the same time, the spring members 111 urge the associated headlamp unit forwardly so the aiming pads 106, 108, and 110 thereof seat against the plane of the associated rim 104 and thereby automatically locate the headlamp unit. As should be apparent, if the support bracket 14 is adjusted in position for proper aiming of the headlamp units 16 and 18, then the replacement headlamp unit for each of the headlamp units 16 and 18 will be automatically aimed when mounted in the support bracket 14 as described above. It will also be noted that rather than having the tangs 118 and 120 and the ears 114 and 116 for connecting one end of each retainer 96 and 98 to the support bracket 14, a screw and nut combination such as provided by the screw 128 and nut 130 could be substituted so that four screws serve to fasten each retainer to the support bracket 14. Also, if desired, the flange 100 associated with each retainer 96 and 98 could be eliminated to provide a rear edge located in a plane parallel to the plane of the rim 104. Such rear planar edge of the ring portion 102 could then serve in the same manner as the rear surface of the flange 100 when in contact with the projections 90, 92 and 94 of the support bracket 14. If the flange is removed, then provision would, of course, have to be made for securing the retainer 96, 98 to the support bracket 14 and in this regard screw means could be provided at outwardly extending corner portions of the rim 104 so as not to contact any part of the flange 112 of the associated headlamp unit.

The support bracket 14 is pivotally supported in the support housing 12 by the pivot pins 64 and 56 which not only extend through the respective holes 133 and 134 in the block members 46 and 48 and through the slots in lower ends of the levers 50 and 52, but also serve to connect the support bracket 14 to the support housing 12. Thus, as seen in FIG. 6, the pin 56 extends through the hole 135 formed in a forwardly projecting tab 136 along the side edge 86 of lamp section 80 of the support bracket 14 while the pin 64 extends through a hole 137 formed in the opposite side edge 86 of lamp section 78 of the support bracket 14. In this manner, the support bracket 14 is supported for pivotal movement about the horizontal axis A which passes through the longitudinal center of the pin 56 and 64. It will also be noted that an upwardly projecting tab 138 is integral with the top edge 82 of the lamp section 78 of support bracket 14 and is formed with an open slot 140. The head 142 of the adjustment screw 22, as seen in FIGS. 1 and 2, is rotatably retained by the slot 140 in the manner of heads 60 and 72 and is located at the point of intersection of the inclined axes B and C. Finally, as seen in FIG. 4, a tension spring 144 is provided which connects the bottom edge 84 of the support bracket 14 to the back wall 30 of the support housing 12 so as to remove any slack which may exist when all of the parts of the headlamp assembly 10 are assembled as seen in FIGS. 1 and 2. Thus, the spring 144 removes all slack from the assembly 10 so as to assure that the heads 60, 72 and 142 of the adjustment screws are firmly seated in the accommodating slot.

From the above description, it should be apparent that when the adjustment screw 22 is rotated in one direction or the other, the support bracket 14 will be pivoted about the pins 56 and 64 so as to adjust the headlamp units 16 and 18 about the horizontal axis A. If it is desired to adjust the position of the headlamp units 16 and 18 about a vertical axis, first the adjustment screw 24 will be rotated to advance the screw 24 into the nut 40, for example as seen in FIG. 5, to cause the lever 52 to move clockwise about the pin 54 resulting in the block member 48 moving forwardly or to the left so that initially the support bracket 14 will be pivoted about the inclined axis B. Then the adjustment screw 22 will be rotated to retract the screw 22 from the associated nut 40 so that the headlamp units are pivoted counterclockwise as seen in FIG. 5 about horizontal axis A. In this manner, the adjustment of the support bracket 14 and accordingly headlamp units 16 and 18 is realized about the vertical axis passing through the point of intersection of the axes B and C so as to achieve the desired aim of the headlamp units. As should be apparent, adjustment of the headlamp units 16 and 18 about a vertical axis can also be achieved by first advancing or retracting the adjustment screw 20 followed by opposite movement of the adjustment screw 22.

An alternate design of the block members 46 and 48 and the associated adjustment screws can be seen in FIG. 7. In this case, rather than having a lever system such as seen in FIGS. 3 and 5 with the adjustment screws 20 and 24 located adjacent the top wall 26, a block member 150 in the form of a cylinder can be provided in each side wall 32 and 34 of the support housing 12, that is slidably received within a rectangular opening 152 formed in a plate 154 secured to the associated side wall. As in the case with the block members 46 and 48, the tab 136 and the side edge 86 of the support bracket 14 can be respectively connected to the associated block members 150 by the pivot pins such as the pivot pins 56 and 64. In addition, the plate 154 is formed with a flange 156 which supports the head 158 of an adjustment screw 160 for rotation about the longitudinal center axis of the screw 160 but prevents axial movement of the screw 160 relative to the plate 154. The threaded shank of the screw 160 is threadably received by the block member 150 so that upon rotation of the screw 160 in one direction, the block member 150 will move horizontally to the right within the opening 152 as seen in FIG. 7, while rotation of the screw 160 in the opposite direction will cause the block member 150 to move horizontally to the left within the opening 152 so as to cause adjustable positioning of the headlamp units 16 and 18 in the manner of the adjustment screw 24 shown in FIG. 5.

Various changes and modifications can be made in the construction of this headlamp assembly without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. A headlamp assembly for a vehicle body having a front end, said headlamp assembly adapted to be mounted to said vehicle body at the front end thereof and including a support bracket providing adjustable aiming movement of a headlamp unit, said headlamp unit being rectangular in configuration and having a peripheral flange provided with an outer vertical surface, said outer vertical surface having three aiming pads that define an aiming plane, said support bracket having a front face, three projections connected to said front face of said support bracket for defining a substantially vertically orientated seating plane, a retainer for maintaining said headlamp unit in said support bracket, said retainer having an outer end and an inner end, said outer end being formed with a radially inwardly extending rim portion and having the inner end of said retainer formed with an edge located in a plane parallel to the plane of said rim portion, fastener means for connecting said retainer to said support bracket so that said edge of said retainer contacts said three projections of said support bracket so as to cause said plane of said rim portion to be located parallel to said seating plane of said three projections, and spring means between said support bracket and said headlamp unit for biasing the latter towards said retainer so that said aiming pads of said headlamp unit are seated on said rim portion of said retainer to automatically aim the headlamp unit without requiring readjustment of said support bracket.

2. A headlamp assembly for a vehicle body having a front end, said headlamp assembly adapted to be mounted to said vehicle body at the front end thereof and including a support bracket providing adjustable aiming movement of a headlamp unit about a horizontal axis and about a vertical axis, said headlamp unit being rectangular in configuration and having a peripheral flange provided with an outer vertical surface, said outer vertical surface having three aiming pads that define an aiming plane, said support bracket having an opening formed therein for receiving said headlamp unit, said opening being surrounded by a rectangularly shaped front face, three projections connected to said front face of said support bracket for defining a substantially vertically orientated seating plane, a retainer for maintaining said headlamp unit in said support bracket, said retainer including a rectangular ring portion having an outer end and an inner end, said outer end being formed with a radially inwardly extending rim portion and having the inner end of said retainer formed with a radially outwardly extending flange located in a plane parallel to the plane of said rim portion, fastener means for connecting said retainer to said support bracket so that said flange of said retainer is seated on said three projections of said support bracket so as to cause said plane of said rim portion to be located parallel to said seating plane of said three projections while the flange of said headlamp unit is located within the confines of said ring portion of said retainer, and spring means between said support bracket and said headlamp unit for biasing the latter towards said retainer so that said aiming pads of said headlamp unit are seated on said rim portion of said retainer to automatically aim the headlamp unit without requiring readjustment of said support bracket.

3. A headlamp assembly for a vehicle body having a front end, said headlamp assembly adapted to be mounted to said vehicle body at the front end thereof and including a support bracket connected to a support housing through adjustment screw means for providing adjustable aiming movement of a headlamp unit about a horizontal axis and about a vertical axis, said headlamp being rectangular in configuration and having a peripheral flange provided with an outer vertical surface, said outer vertical surface having three aiming pads that define an aiming plane, said support bracket having an opening formed therein for receiving said headlamp unit, said opening being surrounded by a rectangularly shaped front face, three projections connected to said front face of said support bracket for defining a substantially vertically orientated seating plane, a retainer for maintaining said headlamp unit in said support bracket, said retainer including an axially extending rectangular ring portion having an outer end and an inner end, said outer end formed with a radially inwardly extending rim portion and having the inner end of said retainer formed with a radially outwardly extending flange located in a plane parallel to the plane of said rim portion, screw means for connecting said retainer to said support bracket so that said flange of said retainer is seated on said three projections of said support bracket so as to cause said plane of said rim portion to be located parallel to said seating plane of said three projections while the flange of said headlamp unit is located within the confines of said ring portion of said retainer, and spring means supported by said face of said support bracket and extending into said opening thereof for engaging the inner vertical surface of said flange of said headlamp unit for biasing the latter towards said retainer so that said aiming pads of said headlamp unit are pressed against and seated on said rim portion of said retainer to automatically aim the headlamp unit without requiring readjustment of said support bracket.

* * * * *